July 12, 1955        R. G. LLATA        2,712,866
LATCH OPERATED POSITIVE CLUTCH
Filed Sept. 16, 1950        2 Sheets-Sheet 1
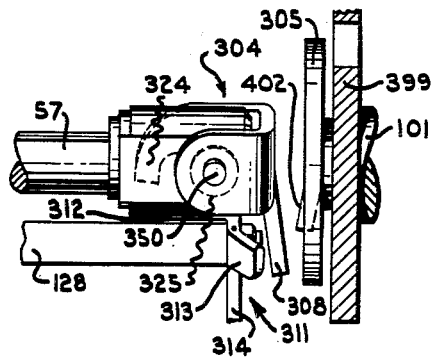
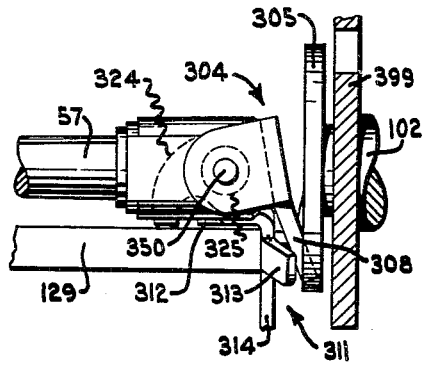
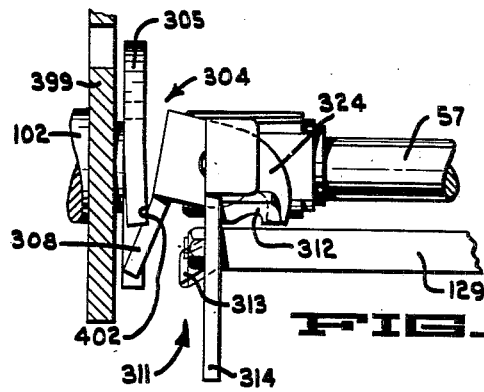
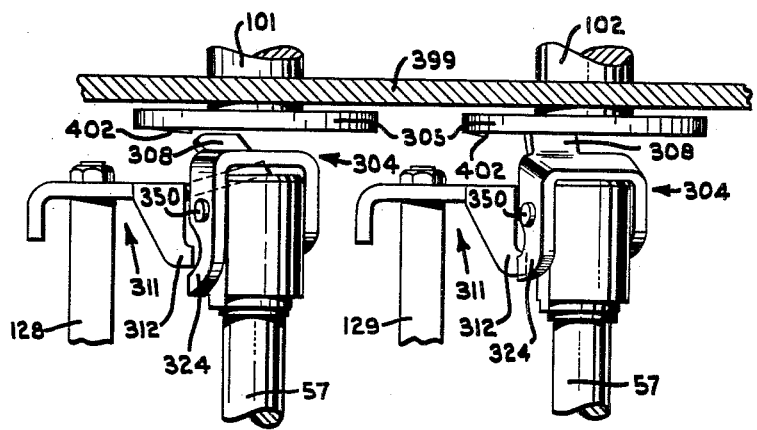
INVENTOR.
RAUL G. LLATA
BY

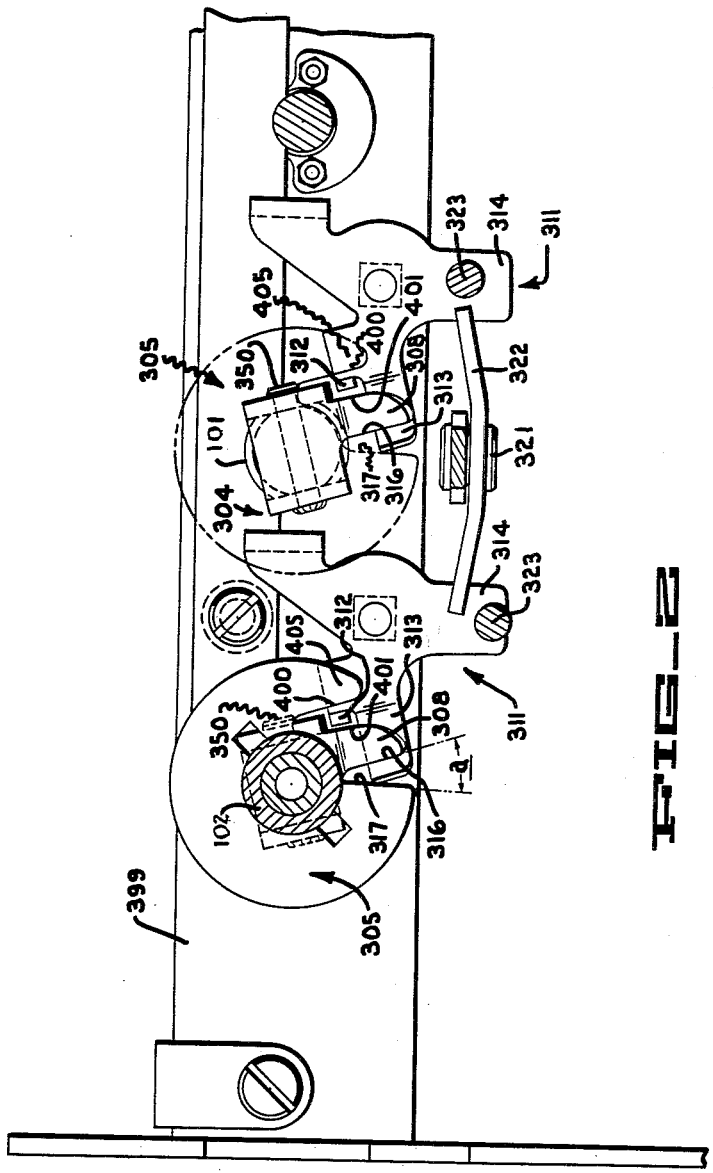

United States Patent Office 2,712,866
Patented July 12, 1955

2,712,866

LATCH OPERATED POSITIVE CLUTCH

Raul G. Llata, Oakland, Calif., assignor to Friden Calculating Machine Co., Inc., a corporation of California Application September 16, 1950, Serial No. 185,223

5 Claims. (Cl. 192—22)

This invention relates to improvements in clutch and power transmissions particularly adapted for use in automatic calculators and other types of business machines. The improvements are shown as embodied in the carriage shifting mechanism of a standard Friden calculating machine provided with, and constitute an improvement of the clutch disclosed in, Morton P. Matthew patent application S. N. 182,682, filed September 1, 1950, now Patent No. 2,679,916, issued June 1, 1954.

The calculating machine carriage shifting mechanism constructed in accordance with the disclosure of the aforesaid patent application is operated by engaging one of the two cyclically and unidirectionally rotated clutch driving pawls with its associated driven arm on the reversible drive gear assembly for determining shifting of the carriage in the desired lateral direction, during which time the other driven arm remains disengaged from its clutch pawl, but is caused to rotate in the opposite direction at the same angular velocity by the single reversible drive gear assembly. Although a friction washer, or other suitable detent means, is provided in such a dual clutch mechanism to normally retain and hold one such pawl or clutch driving member in its disengaged position while the adjacent clutch pawl is retained and held in its engaged position, it is desirable to provide additional means for preventing gravitational forces, vibration, or tilted operation of the machine from causing both clutch pawls becoming accidentally and unintentionally engaged at the same time. It is also desirable that means be provided for substantially preventing engagement or disengagement of either shift clutch except when the calculating machine is at, or near its full-cycle position, thereby providing smoother operating shift controls and further lightening the touch of the associated carriage shift control keys.

It is an important object of the present invention, therefore, to provide an improved cyclic clutch for an automatic business machine, which clutch includes means for substantially preventing engagement or disengagement of the clutch except when the calculating machine is at, or near its full-cycle position.

It is also an object of this invention to provide an improved cyclic clutch for an automatic business machine, which clutch when previously disengaged effectively resists gravitational and other forces tending to re-engage the clutch except when the clutch components are substantially in their full-cycle position.

It is a further object of the invention to provide a cyclic clutch for an automatic business machine, which clutch assembly unless previously engaged is intermittently urged toward its disengaged position in opposition to the action of vibration, gravity, and other forces tending to close the clutch, thereby assuring that a previously disengaged clutch assembly cannot be accidentally, or unintentionally re-engaged at such a time in the operating cycle as to cause improper functioning of the machine.

It is still another object of this invention to provide a cyclic clutch for an automatic business machine, which when previously conditioned for disengagement is disengaged during the first part of the next machine cycle and is effectively held in its disengaged position substantially for the duration of that operating cycle, which clutch while in its disengaged position effectively resists gravitational action, vibration, and other abnormal forces tending to accidentally and unintentionally reengage the clutch.

Further objects are to provide a construction of maximum simplicity, economy, and ease of assembly and disassembly. also such further objects, advantages, and capabilities as will fully appear and as are inherently possessed by the device and the invention described herein.

The invention further resides in the combination, construction, and arrangement of parts illustrated in the accompanying drawings, and while there is shown therein a preferred embodiment thereof, it is to be understood that the same is illustrative of the invention, and that the invention is capable of modification and change and comprehends other details of construction without departing from the spirit thereof, or the scope of the appended claims.

Referring to the drawings:

Fig. 1 is a plan view of the shift clutch mechanism showing one clutch pawl in the clutch-engaging position and the other pawl in its inactive or clutch disengaging position.

Fig. 2 is a rear view of the shift clutch mechanism of Fig. 1 showing the position of the clutch components in their full-cycle position.

Fig. 3 is a side elevational view of the shift clutch mechanism in its normally disengaged position.

Fig. 4 is similar to Fig. 3, but shows the shift controller moved rearwardly so as to position the clutch driving pawl in its clutch-engaging position.

Fig. 5 is similar to Fig. 4, the elevational view being taken from the opposite side of the shift clutch mechanism.

The calculating machine selected for illustration in conjunction with the instant invention is of the general type shown and described in Patent No. 2,229,889 issued to Carl M. F. Friden on January 28, 1941, as modified by Friden Patent No. 2,315,780 dated April 6, 1943. Although a machine of this type utilizes a pair of unidirectional and cyclically driven clutches and a single reversible drive gear assembly to shift the carriage selectively in either direction by engaging one shift clutch while disengaging the other, it will be readily apparent to those skilled in the art that a single clutch mechanism of the type described herein may be used with other known types of reversing mechanisms having a pair of oppositely rotated output shafts which are adapted to accomplish the desired result of shifting the carriage selectively in either direction. It will become evident from a study of the present disclosure, therefore, that the invention is not limited to use with inventions of the type disclosed in Patent Nos. 2,229,889 and 2,315,780, supra, but may also be applied to other types of calculating and business machines with equally desirable results.

In a business machine such as the standard Friden calculating machine, the shift control rods 128, 129 (Fig. 1) may be positioned and controlled by the automatic division mechanism of the machine, by the automatic multiplication mechanism, or by various semiautomatic controls of the type shown and described in the aforesaid Morton P. Matthew patent application S. N. 182,682, filed September 1, 1950. These control rods are operable to move the associated clutch driving pawl 304 into active position for engagement with the corresponding clutch driven disk 305 in such a manner as to drive the reversible drive gear assembly in the proper direction to cause the desired lateral movement of the shiftable carriage. Both of the shift actuating shafts 57 (Fig.

1) in such a standard Friden calculating machine are cyclically and unidirectionally driven in the same direction by power obtained from the motor of the machine through suitable intermediate gearing and a main control clutch, not shown. Hence, if one of the clutch driving pawls 304 is positioned for engagement as shown to the right in Fig. 1 and in Figs. 4 and 5, the coacting clutch driven disk 305 and its associated gear sleeve 101 or 102, which is suitably journalled in the bearing plate 399, is driven in the same direction as the shafts 57. However, the reversible drive gear assembly to which the gear sleeve 101 or 102 is connected, causes the disk 305 carried by the other gear sleeve 102 or 101 (Fig. 3) to be rotated in the opposite direction with respect to the associated actuator shaft 57 which carries the disengaged clutch driving pawl 304 (shown in Fig. 3 and to the left in Fig. 1).

Each clutch driven member is in the form of a flat disk 305 having an open pocket, slot, or recess therein, shaped substantially as shown in Fig. 2, and bounded on one side by the leading edge or clutch driven surface 317 and on the other side by the trailing edge 400 of the disk. The open pocket or recess bounded by the disk edges 317, 400 is considerably wider than the coacting driving arm 308 on the clutch driving pawl 304, so that when the clutch components are in the full-cycle position shown in Fig. 2, the driven clutch edge 317 on disk 305 and the driving edge 316 on the coacting clutch arm 308 are angularly displaced away from each other by a predetermined phase angle $a$ (Fig. 2), while a relatively large predetermined clearance is provided between a trailing edge 401 on the arm 308 and the trailing edge 400 on the disk 305. As is best shown in Figs. 3, 4, and 5 the trailing tip 405 (Fig. 2) of each disk 305 is bent inwardly and upset slightly away from the general plane of disk 305 so as to provide a slightly beveled positive cam surface 402 which acts to tilt and positively move a previously disengaged pawl or driver arm 308 to its fully disengaged position by positive cam action in the event the same becomes accidentally displaced away therefrom during the machine cycle, which disengaged position is free and clear of the associated disk 305 so as to assure complete disengagement of the clutch in the manner to be hereinafter more fully described.

Means are provided for selectively connecting one of the respective gear sleeves 101, 102 (Fig. 1) with the driving motor of the machine through the associated actuating shaft 57 and the corresponding clutch driving pawl 304 and associated follower disk 305. The engagement and disengagement of the driving pawl 304 with its associated follower disk 305 is controlled by the respective shift rods 128, 129 (Fig. 1) which may be manipulated in any desired manner, as by depressing suitable shift control keys located on the control panel of the machine. As is clearly shown in the drawings, the clutch driving pawl 304 which is provided at the rearward end of two of the cyclically and unidirectionally driven actuating shafts 57 is pivotally connected thereto by a pin 350, and each such driving pawl 304 is adapted to be moved by the associated controller 311 into engaging or disengaging position with relation to the associated shift clutch follower disk 305 in the manner now to be described.

Each clutch driving pawl 304 is substantially U-shaped, is pivotally connected to its supporting shaft 57 by the pin 350, and is provided with a clutch-engaging arm, or rotary coupler, 308 having an engaging surface 316 shaped substantially as shown in Fig. 2 and adapted to be angularly displaced away from the coacting clutch-engaging surface 317 on the associated clutch driven disk 305 by the lead angle $a$ whenever the machine is in its normal full-cycle position shown in Fig. 2. This lead angle $a$ (Fig. 2), which also corresponds in magnitude to the angle by which the driven disk 305 is overthrown by the carriage momentum at the end of a shift cycle, has a small magnitude such as 15°, and this angle $a$ represents the predetermined control phase of the machine operating cycle during which all clutch engaging or disengaging movement takes place. In addition to effecting all engagement or disengagement of the clutch during the predetermined control phase of the machine cycle represented by the angle $a$, the relatively short time interval represented thereby may also be utilized for releasing a positive carriage shift stopping and locking mechanism of the type shown and described in Morton P. Matthew patent application S. N. 180,584, filed August 21, 1950, now Patent No. 2,636,678, issued April 28, 1953. After arm 308 and the surface 316 thereon rotate through the angle $a$ and move into position to engage the coacting surface 317 on the follower disk 305, however, the resulting shift drive continues during the relatively long time interval represented by the angle (360°−$a$), at the end of which interval the driving or coupling arm 308 remains within the plane of the driven disk 305. Furthermore the carriage momentum causes the disk 305 to be overthrown so that surface 317 on the disk again becomes separated from the coacting surface 316 on arm 308 by the angle $a$ as the clutch components come to rest in the full-cycle position illustrated in Fig. 2. Depending upon the positioning of the associated controller 311 during the operating phase of the machine cycle represented by the angle (360°−$a$), the thus closed and previously engaged shift clutch will be conditioned for either re-engagement or disengagement during the time interval represented by the angle $a$ which corresponds with the predetermined control phase of the next machine cycle to follow. Hence, if the selected control phase angle $a$ is approximately 15°, the operating phase angle is 360°−15°, or approximately 345°. During this 345° angular displacement of the actuator shafts 57, the associated controller 311 can be effectively positioned to control operation of the clutch at the beginning of the next shift cycle, and a relatively long time interval is thereby provided for control purposes which eliminates critical timing and assures wide latitude and flexibility in the operation of the associated clutch control mechanism.

Assuming now that the clutch control rods 128, 129 are initially positioned forwardly and that the respective shift clutches are disengaged, either control rod 128, 129 may be moved rearwardly by suitable means, as by depressing the corresponding shift key on the control panel, so as to move the associated shift controller 311 from the normally inactive clutch-disengaging position shown in Fig. 3 to the active clutch-engaging position shown in Fig. 4. As each such controller 311 is moved rearwardly, a downwardly depending shove dog 314 thereon rocks an interlock arm 322 (Fig. 2) which is pivoted at 321 so as to move the other shift controller 311 to its inactive position, thereby enabling only one shift clutch to be engaged at the same time. This movement of the controller 311 to its active position may, if desired, operate the pins 323 (Fig. 2) which are spring-urged against the coacting controller shove dogs 314 and are adapted to control the associated carriage shift locking and stopping mechanism in the manner shown and described in Morton P. Matthew patent application S. N. 180,584, filed August 21, 1950. As the shift controller 311 is moved rearwardly from its normally inactive position to the active position shown in Fig. 4, the controller 311 brings the angularly rearwardly extending clutch engaging ear 313 thereon into operative position so as to impart a counter-clockwise rocking movement (Figs. 3 and 4) to the driving pawl 304 during the control phase angle $a$ at the beginning of the next machine cycle. Preferably, though not necessarily, this rearward movement of the associated controller 311 causes the rearward face thereof to contact the pivotally supported pawl 304 in such a manner as to impart a slight counter-clockwise tilting rocking movement thereto before the shift cycle actually starts, whereas the camming action of the ear 313 during the control phase angle $a$ actually completes the movement of the driving or coupling arm 308 into the plane of the clutch-driven or follower disk 305 so as to determine a clutching engagement therewith. A friction washer 325 (Figs. 3 and 4), or other suitable detent device interposed between the pivoted pawl 304 and its supporting shaft 57, is adapted to retain and hold the clutch pawl either in the inactive disengaged position shown in Fig. 3, or in the active and enabled position shown in Fig. 4.

The friction washer 325 or equivalent detent device is normally effective to hold the arm 308 on the inoperative clutch pawl 304 in its fully disengaged position while the machine is performing a shift operation. However, severe vibration, tilted operation of the machine, or gravitational action sometimes produce forces which tend to overcome the restraining action of the friction washer 325, with the result that the disengaged coupler arm 308 may become tilted slightly into partial re-engagement with the oppositely rotating follower disk 305 which is adjacent thereto. In order to minimize this tendency of the disengaged pawl 304 to become accidentally and unintentionally displaced sufficiently to cause possible malfunctioning of the machine, each clutch driven member is shaped in the form of a flat disk 305 provided with an open pocket or recess bounded by the respective leading and trailing edges 317, 400 on the disk, which can only be re-engaged by the coacting driving arm 308 when the disk is oriented with the open recess or pocket disposed immediately adjacent thereto. Moreover, the trailing tip 405 on each such disk is upset inwardly to form cam face 402 operable to restore to its fully disengaged position any driving pawl 304 which has been dislodged to an intermediate position by gravitational forces, vibration, or tilted operation of the machine. The disk tip 405 contacts such accidentally displaced arm towards the end of the machine cycle and forces the same back to its fully disengaged position by positive camming engagement between the disk tip 405 and the displaced coupling and driving arm 308.

It is a characteristic of the mechanism of the instant invention that the clutch driving arm 308 remains in its active position within the general plane of the clutch driven disk 305 at the end of the shift cycle during which the shift clutch was engaged by its associated controller 311. During continuous ordinal shifting the driving surface 316 on the arm 308 remains in active clutching engagement with the coacting surface 317 on the associated clutch disk 305. During such continuous ordinal shifting of the shiftable carriage of the machine, the rearwardly extending clutch disengaging dog 312 on the associated controller 311 is positioned out of operative engagement with the hook-shaped clutch disengaging ear 324 on the clutch driver 304, as shown to the left in Fig. 1.

At the end of the desired ordinal shifting movement, however, the disengaging ear 324 on the shift driver is positioned within the operative range of the disengaging dog 312 on the associated controller so as to condition the previously engaged clutch for disengagement in the manner now to be described. During any time within the relatively long operating phase of the last shift cycle, corresponding approximately to a 345° angular displacement of the actuator shafts 57, the active shift controller 311 may be moved forwardly to its normally inactive position (as shown in Figs. 1 and 3). When the controller 311 lies in its forward position the ear 312 thereon will be engaged by the disengaging ear 324 of the driving pawl 304 then tilted to clutch engaging position (as shown on the right in Fig. 1). However, when the driving pawl 304 is retracted to inoperative position, or the controller is in its rearward operative position, the disengaging ear 312 lies opposite the curved portion of the hook shaped ear 324, so that the two members will not touch.

During the last shift cycle in a carriage shifting movement, the associated controller 311 is restored to its normally inactive forward position under the urgency of its return spring, not shown, and the parts are conditioned for disengagement at the start of the next cycle. However, at the end of the cycle the coupling and driving arm 308 remains within the plane of the clutch follower disk 305 and the actuating shaft 57 comes to rest with the arm 308 in the full-cycle position shown in Fig. 2. Thus, the lug 312 and ear 324 do not quite contact each other in the full-cycle position of the actuator shaft 57. After the arm 308 has been stopped in the full-cycle position shown in Fig. 2, however, the momentum of the shiftable carriage causes the same to overtravel and carry over into its home or full-cycle position determined by the associated carriage centralizing or stopping mechanism, which preferably, though not necessarily, is of the type shown and described in Morton P. Matthew application S. N. 180,584, filed August 21, 1950. As the shifting movement of the carriage is thus arrested and terminated, the surface 317 on follower disk 305 moves away from and angularly ahead of the coacting driving surface 316 on the coupling and driving arm 308 by the predetermined lead or carriage overthrow angle $\alpha$, so that the clutch driven member 305 comes to rest in the full-cycle position shown in Fig. 2. Hence, the associated clutch controller 311 may either be positioned rearwardly to initiate a carriage shift in the same lateral direction during the next cycle, or the other controller 311 may be moved rearwardly to initiate a shift in the opposite direction, or a digitation cycle (such as addition or subtraction) may be started, which restores both shift clutches to the disengaged position. If the direction of carriage shift is reversed by the selective depression of the shift control keys, the previously disengaged shift clutch is engaged during the phase angle $a$ at the beginning of the next cycle in the manner previously described and at substantially the same time as the previously engaged clutch is disengaged by coaction between the ear 324 on the shift driving pawl 304 and the disengaging lug 312 on the associated controller 311.

I claim:

1. In a unidirectional cyclic clutch of the character described, the combination which comprises a driving shaft, a coupling arm extending across the end of said shaft and pivotally mounted thereon about an axis substantially at right angles to the axis of the said shaft, detent means normally operable to retain and hold the said arm selectively in an active and in an inactive adjusted position, a driven clutch disk having an open clutch-engaging pocket therein, the said disk being mounted for rotation about an axis substantially aligned with the axis of the said shaft and in predetermined close proximity to the said coupling arm, the disk along the trailing edge of said pocket being bent inwardly from the plane of said disk toward said shaft, and means operable to move the said arm into and out of the plane of said pocket in the said disk to determine engagement and disengagement of the said clutch selectively.

2. In a unidirectional cyclic clutch of the character described, the combination which comprises a driving shaft, a driven clutch disk having its axis substantially aligned with the axis of the said shaft, the said disk having an open recess therein bounded by a leading clutch-engaging edge and a trailing tip tilted away from the plane of the said disk in such a manner as to inhibit accidental and unintended partial engagement of the said clutch, a driving pawl including a coupling arm pivotally mounted on the said shaft about an axis substantially at right angles to the axis of rotation of the said shaft, and a positionable control member adapted in one setting thereof to coact with the said pawl for determining a predetermined positive clutching engagement with the said disk, the said control member being adapted in another setting thereof and in cooperation with the said tilted tip on the said disk for causing and maintaining substantially complete disengagement of the thus previously disengaged clutch.

3. In a unidirectional cyclic clutch of the character described, the combination which comprises a driving shaft, a driven clutch disk having its axis substantially aligned with the axis of the said shaft, the said disk having an open radial pocket therein bounded by a leading clutch-engaging edge and a trailing tip, the said tip being tilted inwardly from the plane of the said disk toward said shaft, a driving pawl including a coupling arm pivotally mounted on the said shaft about an axis substantially at right angles to the axis of rotation of the said shaft, detent means normally operable to retain and hold the said coupling arm selectively in predetermined active and inactive adjusted positions, and means operable to move the said coupling arm into and out of the said recess in the said disk to determine engagement and disengagement of the said clutch selectively.

4. In a unidirectional cyclic clutch of the character described, the combination which comprises a driving shaft, a driven shaft longitudinally adjacent to and axially aligned with said driving shaft, a driven clutch disk mounted on the adjacent end of said driven shaft, an open clutch-engaging pocket in said disk, a positionable interponent extending across the end of said driving shaft and pivotally mounted on the said shaft for rotation about an axis perpendicular to the axis of said shaft, friction means tending to hold the said interponent selectively in an inactive position out of the plane of the said disk or in an active position intersecting the said open pocket and within the plane of the said disk for determining engagement of the said clutch, and means mounted in a predetermined angular position with respect to said shaft for rocking the said interponent to its active and inactive positions selectively.

5. In a unidirectional cyclic clutch adapted to be engaged or disengaged in a predetermined angular position, the combination which comprises a driving shaft, a driven shaft longitudinally adjacent to and axially aligned with said driving shaft, a driven clutch disk mounted on the adjacent end of said driven shaft, an open clutch-engaging pocket in said disk, a positionable interponent extending across the end of said driving shaft and pivotally mounted on the said shaft for rotation about an axis perpendicular to the axis of said shaft, detent means resiliently holding the said interponent selectively in an inactive position out of the plane of the said disk or in an active position intersecting the said open pocket and within the plane of the said disk for determining engagement of the said clutch, and a control member mounted for longitudinal movement along an axis parallel to that of said driving shaft and movable to one position to rock said interponent to its active position and to another position to rock said interponent to its inactive position.

References Cited in the file of this patent

UNITED STATES PATENTS

| | | |
|---|---|---|
| 912,087 | Dempsey | Feb. 9, 1909 |
| 1,340,333 | France | May 18, 1920 |
| 1,771,454 | Ward | July 29, 1930 |
| 1,798,047 | Ubrich | Mar. 24, 1931 |
| 1,921,264 | Sampson | Aug. 8, 1933 |